United States Patent [19]
Becker

[11] Patent Number: 5,213,222
[45] Date of Patent: May 25, 1993

[54] MOBIL CRANE

[75] Inventor: Rudolf Becker, Ehingen Donau, Fed. Rep. of Germany

[73] Assignee: Leigherr-Werk Ehingen GmbH, Ehingen Donau, Fed. Rep. of Germany

[21] Appl. No.: 652,040

[22] Filed: Feb. 7, 1991

[30] Foreign Application Priority Data

Feb. 12, 1990 [DE] Fed. Rep. of Germany ... 9001589[U]

[51] Int. Cl.⁵ .................. B66C 23/26; B66C 23/44; B66C 23/84
[52] U.S. Cl. ................................. 212/253; 212/180; 212/175; 212/199
[58] Field of Search ............... 212/199, 253, 175, 180

[56] References Cited

U.S. PATENT DOCUMENTS

| | | | |
|---|---|---|---|
| 3,398,984 | 8/1968 | Ajero | 296/1 |
| 3,923,163 | 12/1975 | Brewer | 212/175 |
| 4,332,328 | 6/1982 | Otto et al. | 212/253 |
| 4,478,340 | 10/1984 | Delago | 212/253 |
| 4,508,233 | 4/1985 | Helms | 212/199 |
| 4,601,401 | 7/1986 | Wittman et al. | 212/180 |

FOREIGN PATENT DOCUMENTS

| | | |
|---|---|---|
| 1281652 | 4/1966 | Fed. Rep. of Germany . |
| 2253068 | 7/1973 | Fed. Rep. of Germany . |
| 2450003 | 10/1974 | Fed. Rep. of Germany . |
| 3721673 | 1/1989 | Fed. Rep. of Germany . |
| 8904010 | 3/1989 | Fed. Rep. of Germany . |
| 2286785 | 4/1976 | France . |

Primary Examiner—Joseph F. Peters, Jr.
Assistant Examiner—Kenneth Lee
Attorney, Agent, or Firm—Morgan & Finnegan

[57] ABSTRACT

A mobile crane comprising a chassis, which has at least two axles and on which a revolving superstructure is movably mounted by means of a slewing bearing consisting of an outer ring and an inner ring, a preferably telescopic boom, which is pivoted to the revolving superstructure and which is adapted to be supported on a supporting bracket of the crane in position for road travel, and a cabin for use during crane and road travel operations. A carrying ring is rotatably mounted on that ring of the slewing bearing which is connected to the revolving superstructure, the cabin is secured to said carrying ring, and the cabin or the carrying ring can selectively be connected either to the chassis or to the revolving superstructure.

4 Claims, 7 Drawing Sheets

MOBIL CRANE

BACKGROUND OF THE INVENTION

1. Field of the Invention

This invention relates to a mobile crane comprising a chassis, which has at least two axles and on which a revolving superstructure is movably mounted by means of a slewing bearing consisting of an outer ring and an inner ring, also comprising a preferably telescopic boom, which is pivoted to the revolving superstructure and which is adapted to be supported on a supporting bracket of the crane in position for road travel, and also comprising a cabin for use during crane and road travel operations.

2. Description of the Prior Art

Mobile cranes of that kind can be operated in two modes, namely, in a travel mode, preferably road travel mode, and in a crane mode, in which the chassis is usually supported by extensible or hinged struts and the lifting and handling operations are performed in that the boom is pivotally moved and the superstructure is rotated. For these two modes of operation a cabin is required, which during road travel provides for the driver the required view over the road and which during crane operation permits a constant watching of the crane hook during the lifting and transporting operations. In order to meet said requirement, it is known to provide a mobile crane of the kind described first hereinbefore with two cabins, one of which is mounted on the chassis so that the driver has a good view over the road whereas the other cabin for use during crane operation is mounted on the revolving superstructure and faces the tip of the boom. But the provision of the two cabins for road travel and for crane operation, respectively, is expensive and adds to the cost of the crane truck. For this reason, mobile trucks have also been provided with a combined cabin for use during travel and crane operations.

In such known cranes comprising a single cabin for use during travel and crane operations, the cabin is mounted either on the chassis or on the rotating deck so as to face in the direction of the boom. If the cabin is mounted on the chassis the view permitted during crane operation will be inadequate in most positions of the revolving superstructure because the cabin does not follow the slowing movements.

On the other hand, if the cabin is mounted on the revolving superstructure, the view during travel operation will be greatly obstructed by the boom so that, as a rule, the mobile crane cannot be licensed under the motor vehicle construction and use regulation. Such cranes are known as slow-moving trucks for use on building sites or as rough-terrain cranes and for travel on the building site where the boom can slightly be raised so that the view will be improved. But such cranes cannot be licensed for general road travel.

It is also known to provide a mobile crane which is of the kind described first hereinbefore and has a double-purpose operator's cabin, which is mounted on the revolving superstructure. That double-purpose operator's cabin has for road travel a seat which permits the operator to view over the road in the direction which is opposite to the boom. For crane operation the operator occupies a second seat, which provides for the operator a view toward the tip of the boom. That combined cabin is very large and requires two control stations for road travel and crane operation, respectively.

SUMMARY OF THE INVENTION

It is an object of the invention to provide a mobile crane which is of the kind described first hereinbefore and which has only a single cabin for use during road travel and crane operations, which cabin provides for the driver and crane operator an optimum view in all modes of operation.

In a mobile crane of the kind described first hereinbefore that object is accomplished in accordance with the invention in that a carrying ring is rotatably mounted on that ring of the slewing bearing which is connected to the revolving superstructure, the cabin is secured to said carrying ring, and the cabin or the carrying ring can selectively be connected either to the chassis or to the revolving superstructure.

The mobile crane in accordance with the invention comprises a combined cabin for use during crane operation and road travel and all travel movements and crane movements can be controlled from that cabin. In position for use during road travel, the cabin is connected to the chassis and when viewed in the direction of travel the cabin is disposed on the left of the boom and the direction of view of the driver is then opposite to the direction of the boom.

To move the cabin to its position for use during crane operation, the cabin is disconnected from the chassis so that the carrying ring can then freely be rotated on the ring of the revolving superstructure or of the revolving deck. Before the cabin is then turned through 180 degrees to its position for use during crane operation, the boom is sufficiently raised so that the boom can be turned over the cabin through 180 degrees as the cabin is turned. During that operation, the carrying bracket, which is connected to the revolving superstructure and carries the counterweight and the winches and which protrudes from the revolving superstructure opposite to the direction of the boom can then revolve past the cabin without an obstruction because the cabin is turned about said bracket in the opposite direction. As soon as the cabin has been turned through 180 degrees from its position for use during crane operation, the cabin is connected to the revolving superstructure by bolts or other means. In that position the cabin provides for the crane operator an optimum view toward the load which is to be lifted.

Before the pivotal movement of the cabin from its position for use during road travel to its position for use during crane operation the cabin may remain connected to the chassis until the revolving superstructure has been rotated through 180 degrees as described, whereafter the connection between the cabin and the chassis by bolts or other means is eliminated and the cabin is connected to the revolving superstructure.

The carrying ring which carries the cabin may be movably mounted by a rolling element bearing, preferably a ball bearing, on a ring which carries the revolving superstructure. That movable mounting will permit the carrying ring to be easily turned, possibly even by hand.

Under the motor vehicle construction and use regulation, the mobile crane in accordance with the invention can be licensed to travel at a speed up to about 80 km/h. But for travel at such speed the steering wheel and the steering column must be mechanically coupled to the steering gear. For this reason, it is contemplated within the scope of the invention that, when the cabin in position for use during road travel is connected to the chassis, the steering wheel and the steering column are adapted to be connected by mechanical coupling and mechanical transmitting means to the steering gear. That connection may be established by simple plug joints or other joints of known type. Mobile cranes of the kind described first hereinbefore usually comprise a strictly hydrostatic steering system in addition to the steering system consisting of mechanical transmitting elements. During road travel, in which the steering wheel is connected to the steering gear by mechanical transmitting elements, the hydraulic system for hydrostatic steering may be used as steering booster.

During crane operation, the mechanical coupling to the steering gear is eliminated so that only the hydrostatic steering system is then effective.

In a different embodiment of the invention, switching means are provided, which when the mechanical coupling has been eliminated and only the hydrostatic steering system is effective will prevent a shifting of the power shift transmission for the travel of the mobile crane to the gears for the higher speeds. That safety switch will ensure that the maximum speed of travel can be restricted to about 40 km/h, which is permissible for a strictly hydrostatic steering. As a result, the crane in accordance with the invention cannot travel at high speed unless the mechanical steering connection has been established before and this will not be possible unless the crane operator's cabin has been turned to its position for use during road travel and has been connected to the chassis.

Although there is only a single cabin for the crane operator and driver, the mobile crane will provide an optimum view during crane operation and travel operation. This means that a mobile crane has been provided, which has only one cabin and which is economical and technically satisfactory. The mobile crane in accordance with the invention can be used immediately after its arrival on a building site even in cold weather because it is not necessary to heat up another cabin.

DETAILED DESCRIPTION OF THE PREFERRED EMBODIMENT

An illustrative embodiment of the invention will now be described in more detail with reference to the drawings.

The mobile crane comprises a chassis 1, which has two axles and on which a revolving superstructure 3 is rotatably mounted by means of a slewing bearing 2. The revolving superstructure 3 comprises a rotating deck, to which a bracket 4 is secured, which in position for travel protrudes forwardly and to which the telescopic boom 6 is pivoted on a pivot 5. The luffing cylinder 7 is also movably mounted on the bracket 4 and is operable to luff the boom 6. The several length sections of the telescopic boom can hydraulically be extended and retracted in known manner.

In position for road travel the boom can be supported by a gantry 9, which is connected to the chassis 1.

Figure 1:
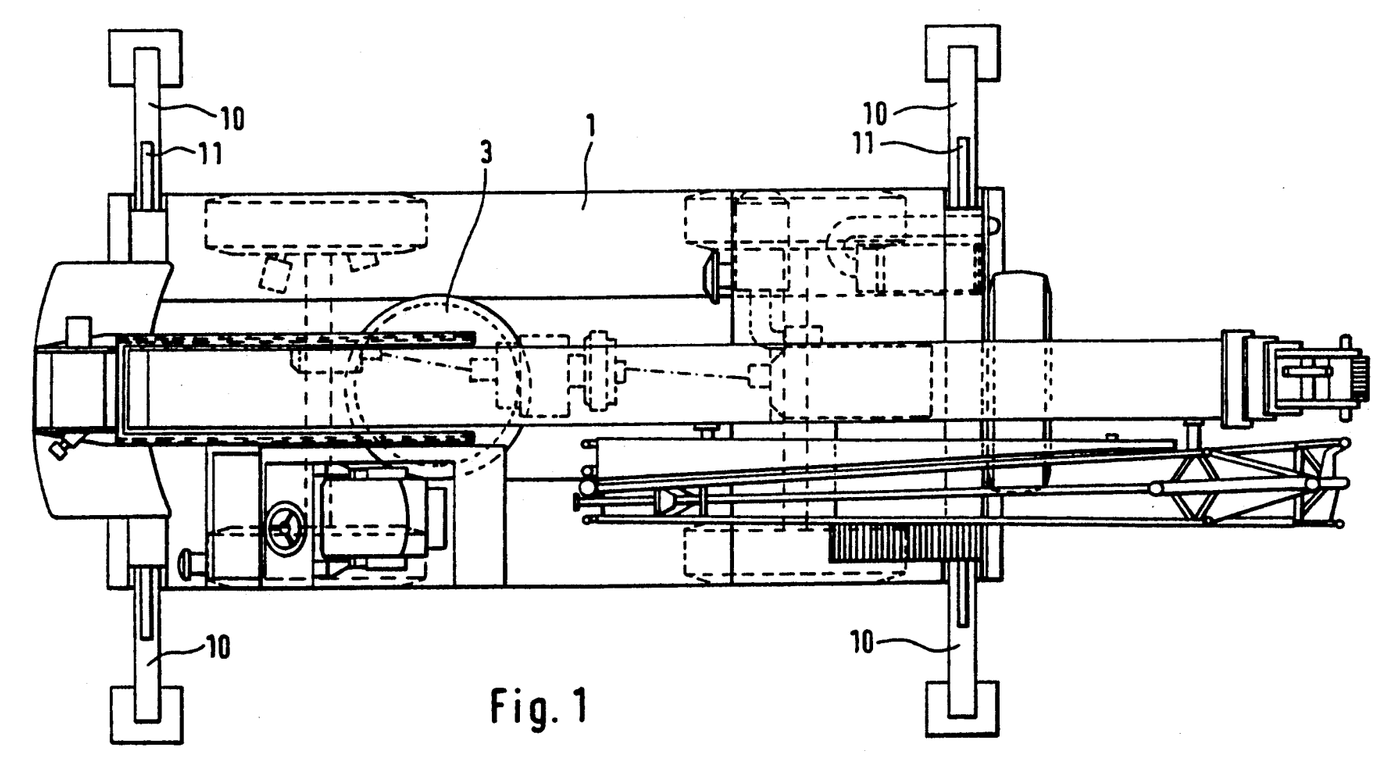
FIG. 1 is a top plan view showing a mobile crane comprising only one cabin for use during travel and crane operations.
Figure 2:
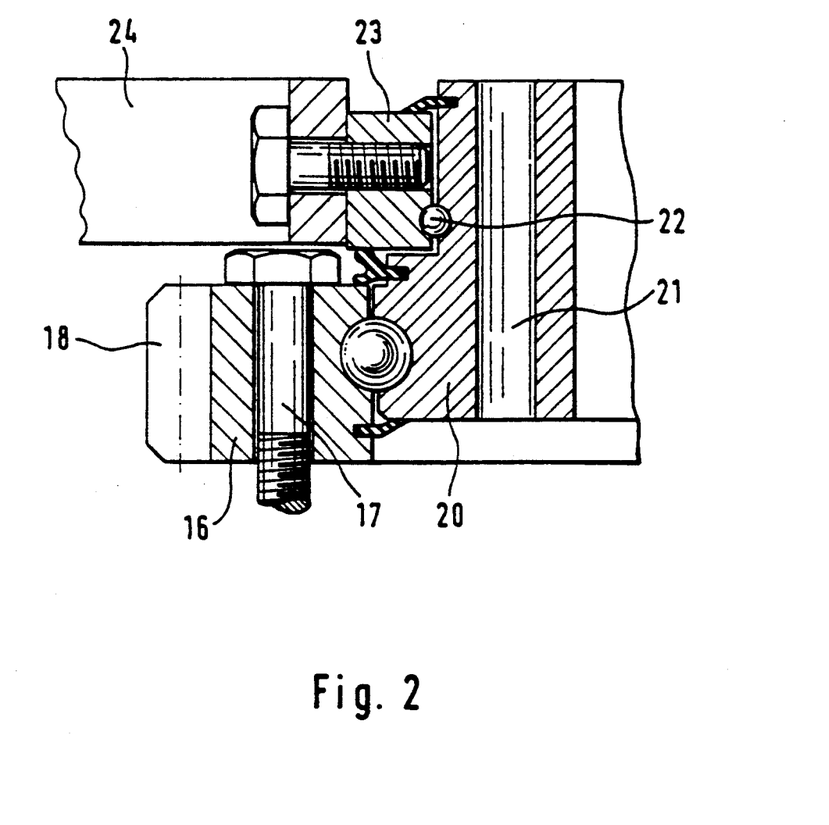
FIG. 2 is a sectional view taken on line A—A in FIG. 1 and showing on a larger scale the slewing bearing which connects the chassis to the revolving superstructure.
Figure 3:
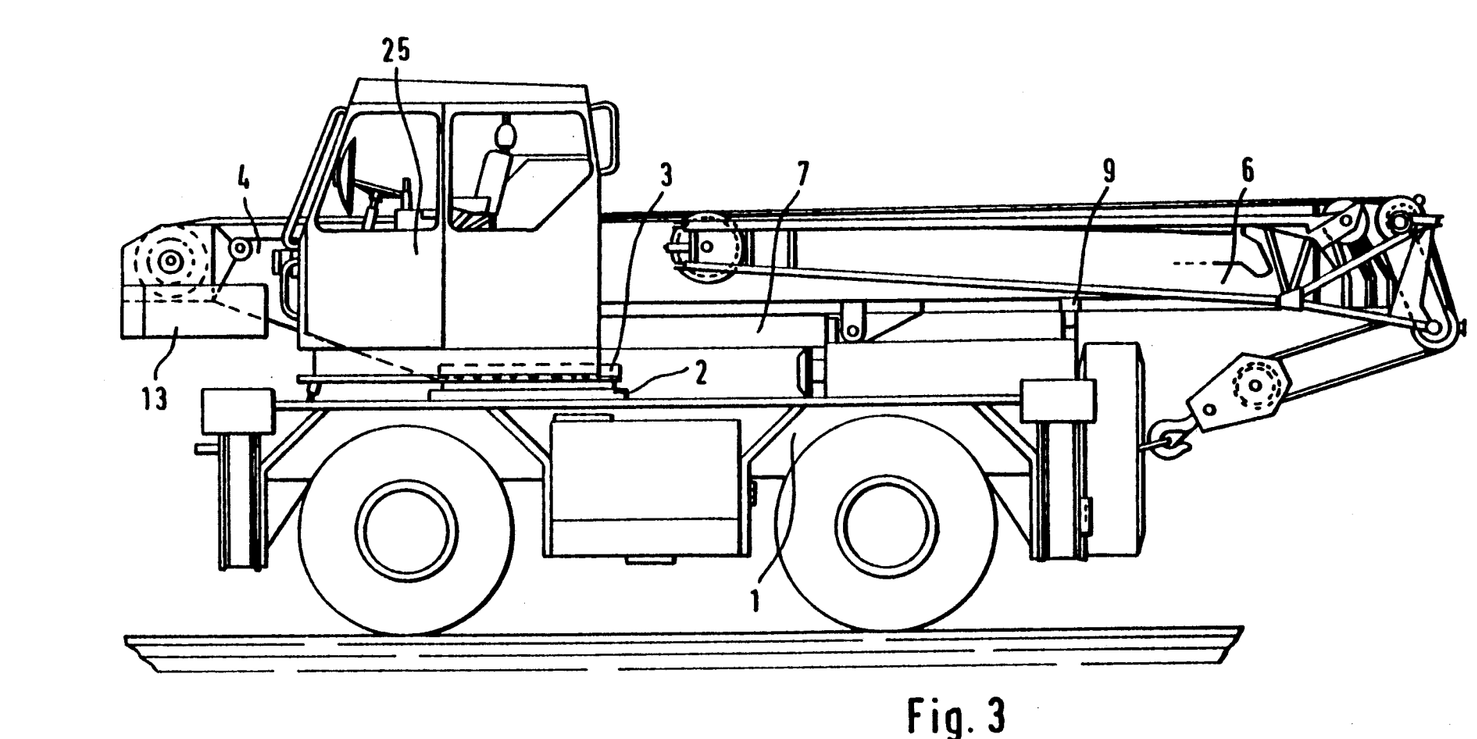
FIG. 3 is an elevation of the mobile crane in position for travel, viewed from the left in FIG. 1.
Figure 4:
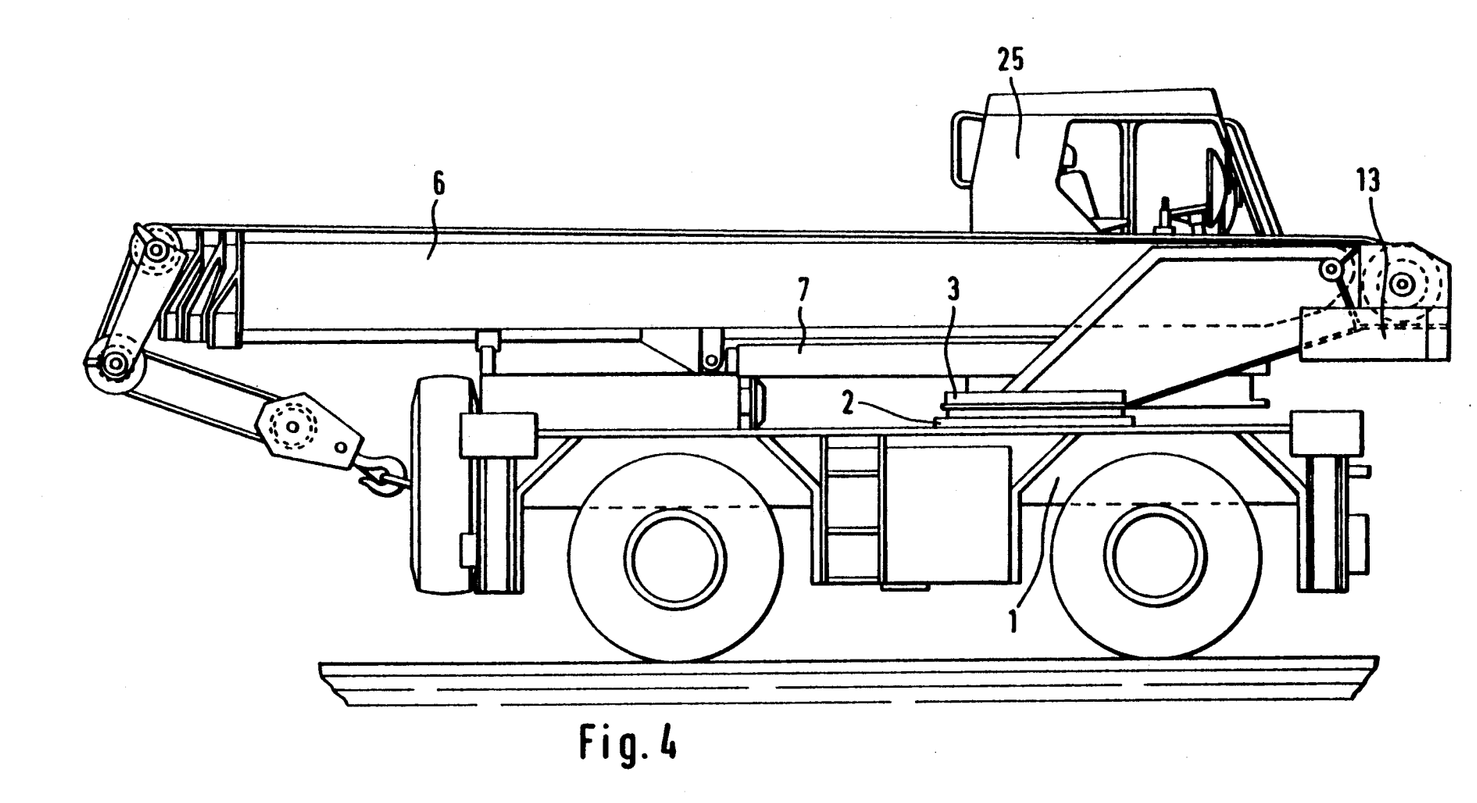
FIG. 4 shows the mobile crane in position for travel viewed from the right in FIG. 3.
Figure 5:
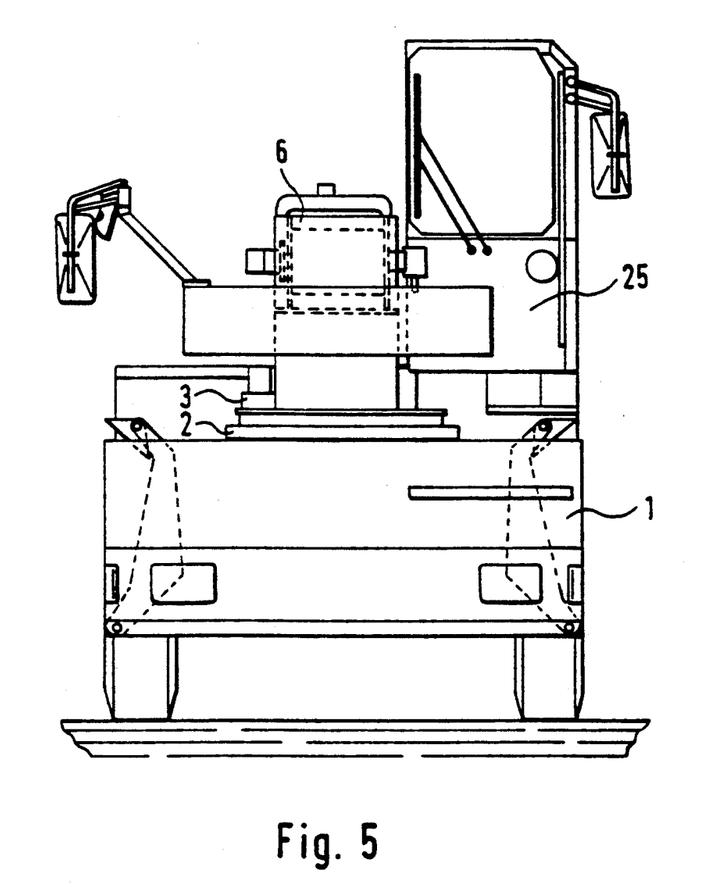
FIG. 5 is a front elevation showing the mobile crane of FIGS. 1, 3 and 4.
Figure 6:
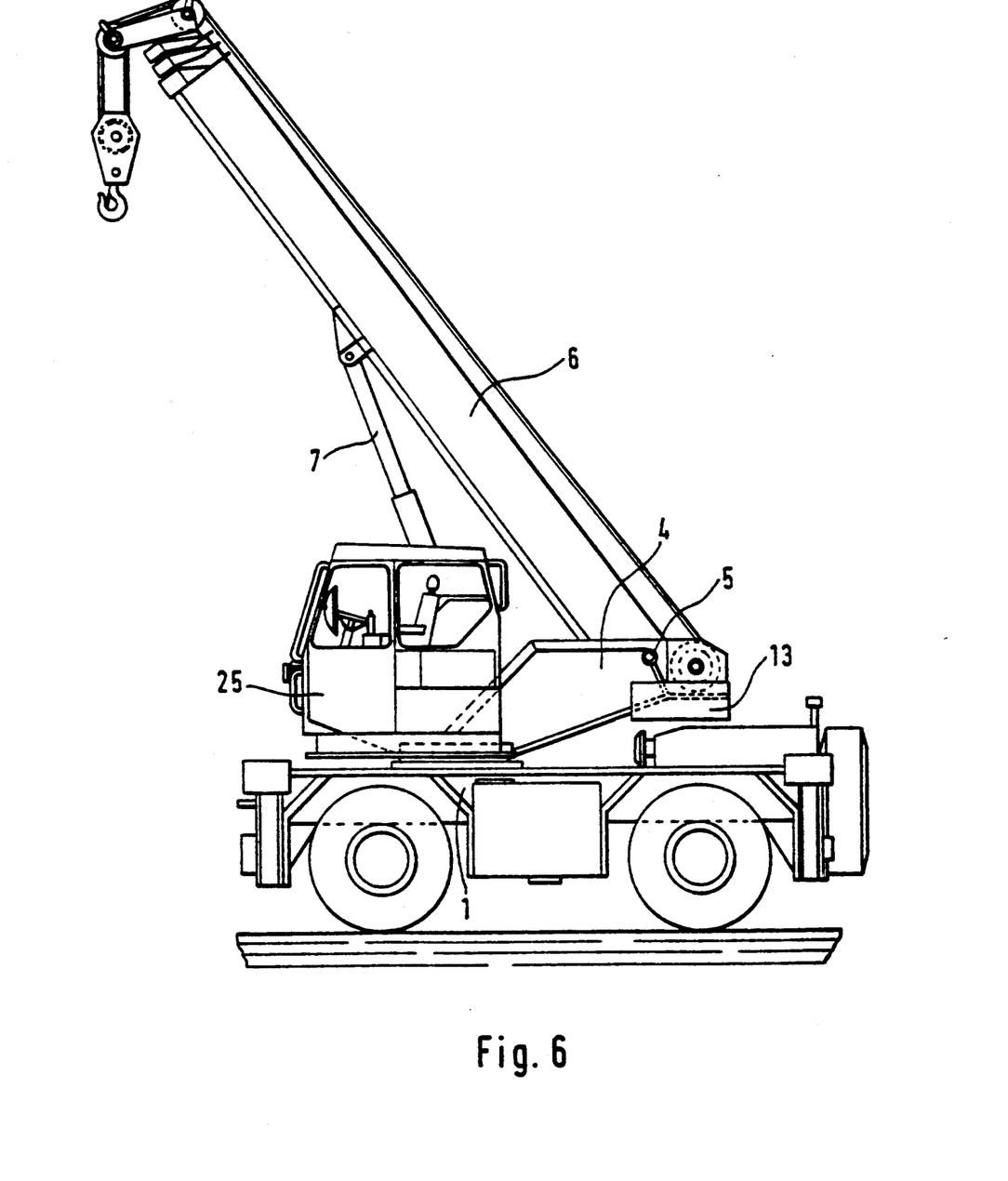
FIG. 6 shows the mobile crane viewed from the left in FIG. 1 and with the driver's cabin turned to its position for use during crane operation and united to the revolving superstructure.
Figure 7:
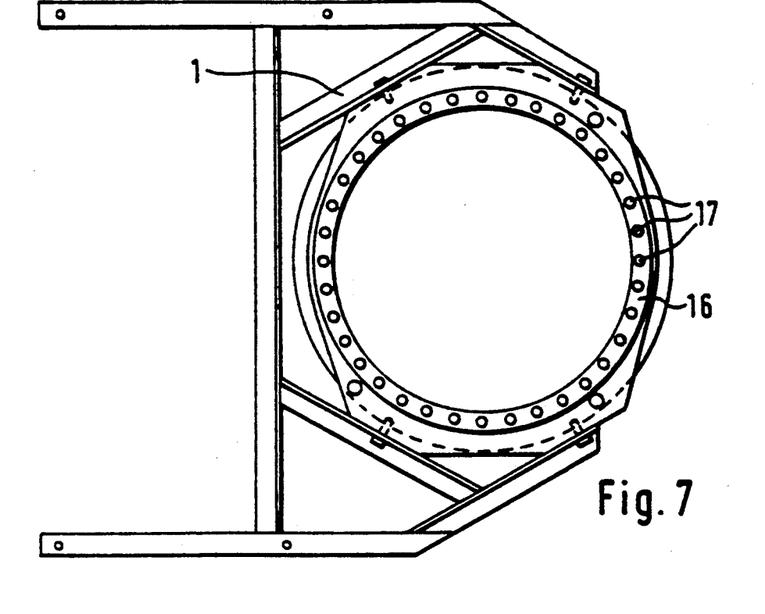
FIG. 7 is a top plan view showing the slewing ring connected to the chassis whereas the rotating deck has been removed.
Figure 8:
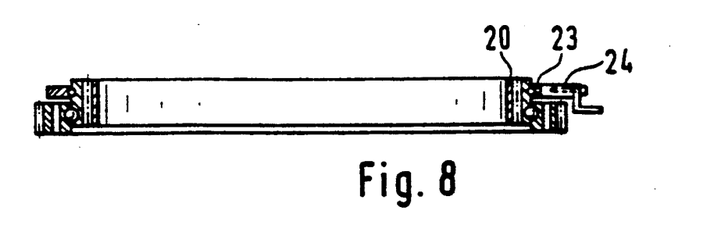
FIG. 8 is a sectional view showing the slewing bearing.
Figure 9:
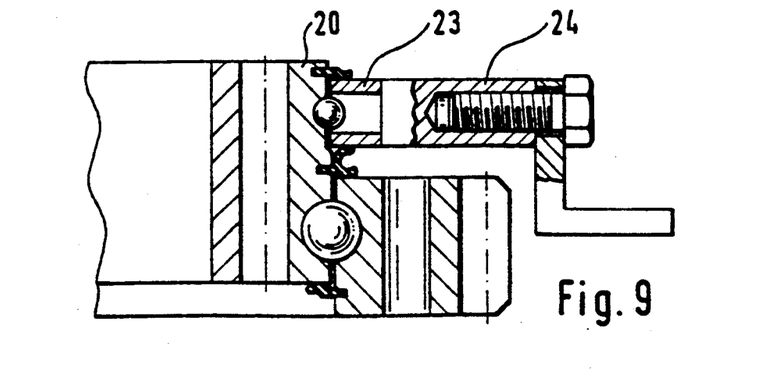
FIG. 9 is a sectional view which is similar to FIG. 2 and shows the slewing bearing.

Struts 10 are hinged to the corner portions of the chassis 1 and are adapted to be pivotally raised by hydraulic cylinders 11 to the position apparent from FIG. 5 and can be swung out to the position shown in FIG. 1.

The counterweight 13 is secured to the outer end of the bracket 4.

The outer ring 16 of the slewing bearing 2 is secured to the chassis 1 by a number of screws 17 and has external gear teeth 18 in mesh with the drive pinion, not shown, of the slewing drive, which is mounted on the rotating deck.

Inasmuch as the mobile crane has been described thus far, it is of known design and need not be described in more detail.

The inner ring 20 of the slewing bearing 2 is movably mounted on the outer ring 16 in conventional manner by means of balls. The inner ring 20 is also provided with bores 21 for fixing the rotating rack 3.

A further outer ring 23 is rotatably mounted by means of a ball bearing 22 on the upper portion of the inner ring 20. A carrying bracket 24, which carries a cabin 25 for the driver and crane operator, is secured by screws to the outer ring 23 by means of screws. As a result, the driver's cabin is rotatably mounted on the inner ring 20 by means of the carrying ring 23. The cabin 25 for the driver and crane operator is movably mounted and supported on the carrying ring 23 by means of the bracket 24 and in the position for travel shown in FIGS. 1, 3, 4 and 5 is fixedly connected to the chassis 1 by bolts or locking means, not shown.

In the position for crane operation apparent from FIG. 5 the driver's cabin 25 is disconnected from the chassis 1 and is additionally connected to the inner ring 20 or to the rotating deck 3 by bolts or other means. For this reason the cabin 25 in the position for use during crane operation is non-rotatably held on the revolving superstructure 3.

For a change from the position from use during road travel to the position for use during crane operation the rotating deck 3 must be turned through 180 degrees relative to the cabin 25 so that the bracket 4 provided with the counterweight 13 will then protrude in a rearward direction. To permit said turning movement the boom 6 must be sufficiently raised by means of the luffing cylinder 7 so that the boom can freely be turned over the cabin. After the rotation through 180 degrees, the bolts connecting the cabin 25 to the chassis 1 must be released and the cabin must be bolted to the revolving superstructure. It will be understood that the cabin 25 may also be turned by hand and in that case the cabin will be disconnected from the revolving superstructure before the cabin is turned.

I claim:

1. In a mobile crane, comprising
a chassis, which has at least two axles and on which a revolving superstructure is movably mounted by means of a slewing bearing having an outer ring and an inner ring,
a boom, which is pivoted to the revolving superstructure and which is adapted to be supported on a supporting bracket of the crane in position for road travel, and
a cabin for use during crane and road travel operations,
the improvement wherein a carrying ring is rotatably mounted on a ring of the slewing bearing which is connected to the revolving superstructure, the cabin is secured to said carrying ring, and the cabin can be selectively connected either to the chassis or to the revolving superstructure.

2. A mobile crane according to claim 1, wherein the carrying ring is rotatably mounted by a rolling element bearing on the ring which carries the revolving superstructure.

3. A mobile crane according to claim 1, wherein, when the cabin is in position for use during road travel and is connected to the chassis, a steering wheel and steering column in the cabin are connected by mechanical coupling and mechanical transmitting means to a steering gear.

4. A mobile crane according to claim 1, wherein the boom is telescopic.

* * * * *